(12) United States Patent
Warren

(10) Patent No.: US 10,641,595 B2
(45) Date of Patent: May 5, 2020

(54) LOW PROFILE TRIAXIAL BLADE TIP CLEARANCE PROBE ASSEMBLY WITH DRIVEN GUARD

(71) Applicant: UNITED TECHNOLOGIES CORPORATION, Farmington, CT (US)

(72) Inventor: Eli Cole Warren, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 261 days.

(21) Appl. No.: 15/948,792

(22) Filed: Apr. 9, 2018

(65) Prior Publication Data
US 2019/0310067 A1 Oct. 10, 2019

(51) Int. Cl.
| | | |
|---|---|---|
| *F01D 21/00* | (2006.01) | |
| *G01B 7/14* | (2006.01) | |
| *F04D 27/00* | (2006.01) | |
| *G01M 15/14* | (2006.01) | |
| *F02K 3/06* | (2006.01) | |

(52) U.S. Cl.
CPC ............. *G01B 7/14* (2013.01); *F01D 21/003* (2013.01); *F02K 3/06* (2013.01); *F04D 27/001* (2013.01); *G01M 15/14* (2013.01); *F05D 2220/323* (2013.01); *F05D 2260/83* (2013.01)

(58) Field of Classification Search
CPC ............. F04D 27/001; F05D 2220/323; F05D 2260/83; F05D 2270/80; F05D 2270/821; F01D 17/02; F01D 21/003; F02K 3/06; G01B 7/14; G01M 15/14
See application file for complete search history.

(56) References Cited

U.S. PATENT DOCUMENTS

| | | | | |
|---|---|---|---|---|
| 4,063,167 A | * | 12/1977 | Duly ................. | G01R 27/2605 324/671 |
| 4,804,905 A | * | 2/1989 | Ding ...................... | F01D 21/04 174/152 GM |
| 4,813,273 A | * | 3/1989 | Parsons ................... | F01D 21/04 73/112.01 |
| 5,070,302 A | * | 12/1991 | Marcus .................. | G01B 7/003 324/661 |
| 5,101,165 A | * | 3/1992 | Rickards .................. | G01B 7/14 324/662 |
| 5,166,626 A | * | 11/1992 | Hester ...................... | G01B 7/14 324/683 |
| 5,760,593 A | * | 6/1998 | Lawrence ................ | G01B 7/14 250/559.31 |

(Continued)

*Primary Examiner* — David J Bolduc
(74) *Attorney, Agent, or Firm* — Snell & Wilmer L.L.P.

(57) ABSTRACT

A low profile triaxial BTC probe may comprise a housing having a first body, a first cavity within the first body, and a neck extending radially from the first body, an outer hat insulator disposed within the first cavity, an inner housing, disposed within the first cavity, having a second body and a second cavity within the second body, an inner hat insulator disposed within the second cavity, a sensor element disposed within the second cavity, an inner cap insulator disposed within the second cavity, an inner cap over the inner cap insulator, an outer cap insulator disposed within the first cavity, a cap over the outer cap insulator, and a hard lead comprising a hard shield, a driven guard, and a lead wire.

20 Claims, 11 Drawing Sheets

(56) References Cited

U.S. PATENT DOCUMENTS

| | | | | |
|---|---|---|---|---|
| 5,818,242 A * | 10/1998 | Grzybowski | F01D 11/025 324/642 |
| 6,054,866 A * | 4/2000 | Mansfield | G01B 7/14 324/635 |
| 6,739,120 B2 * | 5/2004 | Moniz | F01D 5/022 60/226.1 |
| 6,927,567 B1 * | 8/2005 | Roeseler | F01D 17/06 324/207.25 |
| 7,808,233 B2 * | 10/2010 | Jensen | H02K 11/20 324/174 |
| 9,245,786 B2 * | 1/2016 | Koelmel | H01L 21/67115 |
| 9,279,336 B2 | 3/2016 | Warren | |
| 9,316,479 B2 | 4/2016 | Warren et al. | |
| 9,709,376 B2 * | 7/2017 | Zhe | G01B 7/14 |
| 2005/0280412 A1 * | 12/2005 | Roeseler | F01D 17/06 324/228 |
| 2007/0108050 A1 * | 5/2007 | Elliott | G01B 7/14 204/424 |
| 2010/0079136 A1 * | 4/2010 | Phillips | F01D 11/20 324/207.16 |
| 2010/0097079 A1 * | 4/2010 | Sheikman | G01B 7/14 324/686 |
| 2013/0321002 A1 * | 12/2013 | Elliott | G01R 3/00 324/662 |
| 2014/0056692 A1 * | 2/2014 | Warren | G01B 7/14 415/118 |
| 2014/0064924 A1 * | 3/2014 | Warren | G01B 7/14 415/118 |
| 2014/0064925 A1 * | 3/2014 | Warren | G01D 11/16 415/118 |
| 2014/0064926 A1 * | 3/2014 | Warren | F01D 11/20 415/118 |
| 2014/0076037 A1 * | 3/2014 | Warren | G01B 7/22 73/112.01 |
| 2014/0090492 A1 * | 4/2014 | Warren | G01B 7/14 73/866.5 |
| 2014/0252183 A1 * | 9/2014 | Warren | F01D 11/20 248/163.1 |
| 2015/0198504 A1 * | 7/2015 | Walling | G01B 7/14 73/112.01 |
| 2016/0195411 A1 | 7/2016 | Ford et al. | |
| 2018/0238673 A1 * | 8/2018 | Warren | G01B 7/14 |
| 2019/0078869 A1 * | 3/2019 | Warren | F01D 17/02 |
| 2019/0169355 A1 * | 6/2019 | Warren | C08G 59/06 |
| 2019/0170011 A1 * | 6/2019 | Warren | F04D 29/526 |
| 2019/0170495 A1 * | 6/2019 | Warren | G01B 7/023 |

* cited by examiner

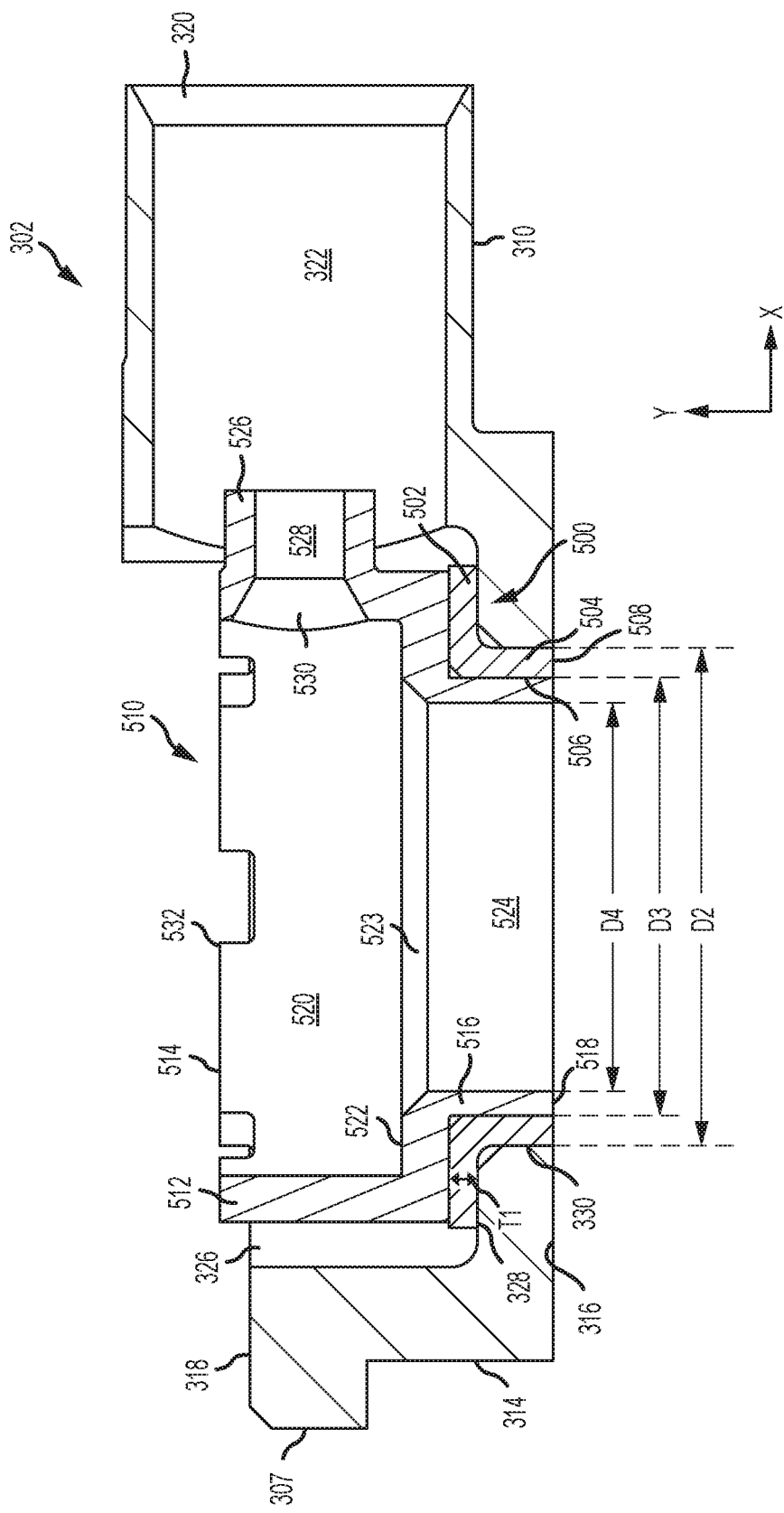

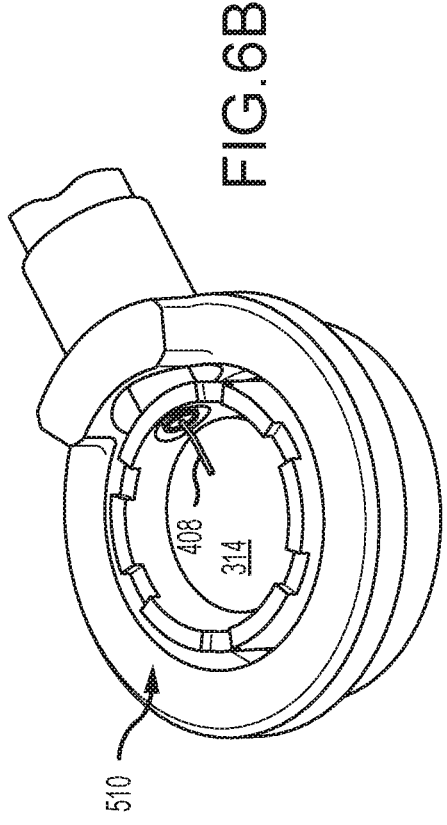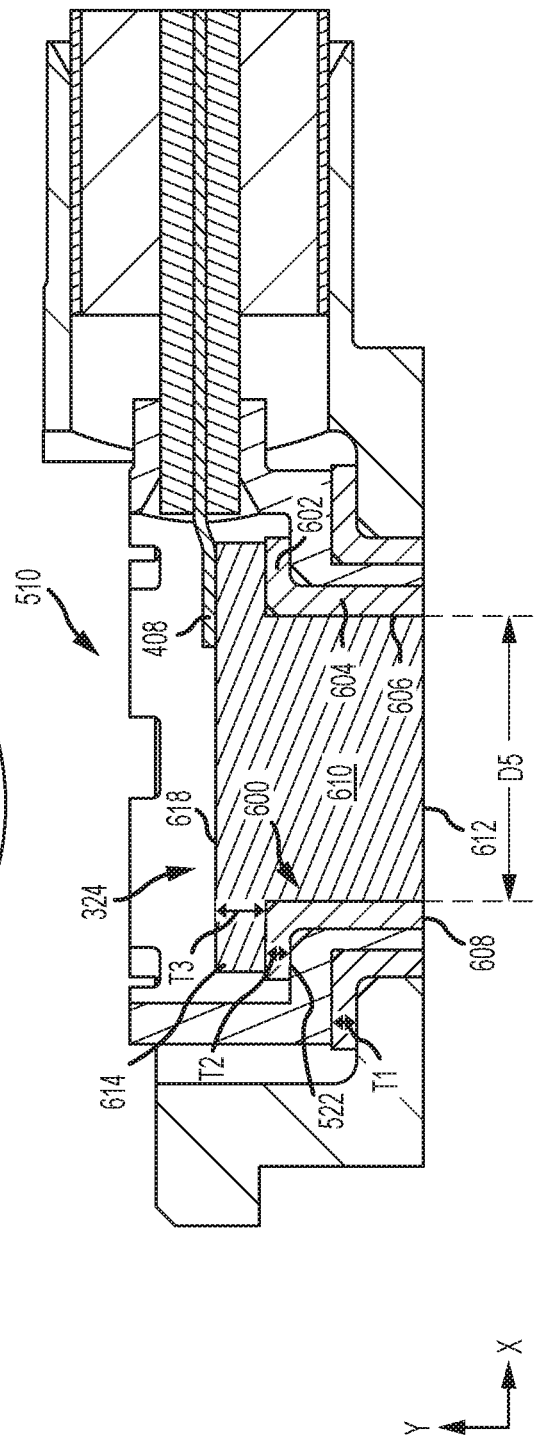

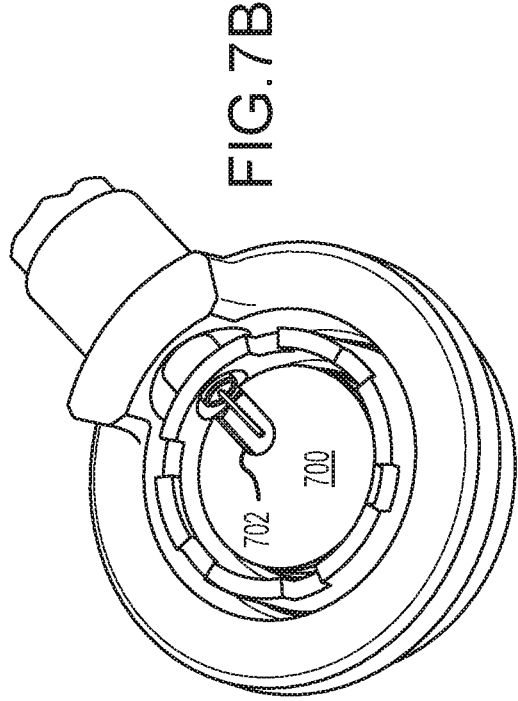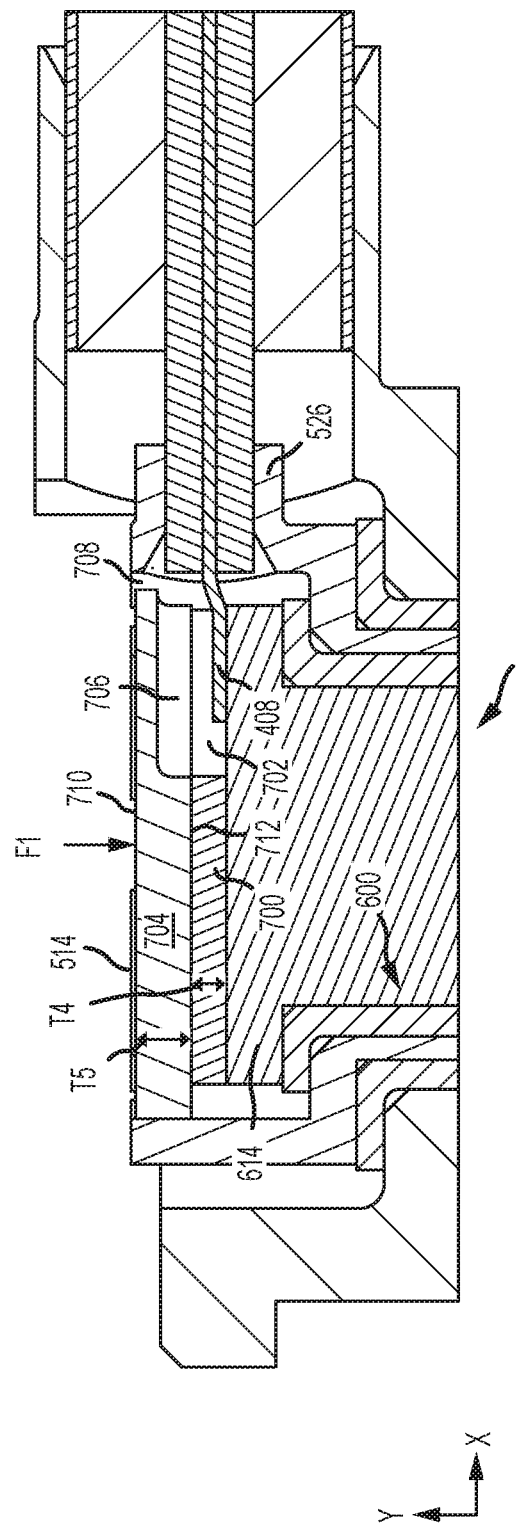

LOW PROFILE TRIAXIAL BLADE TIP CLEARANCE PROBE ASSEMBLY WITH DRIVEN GUARD

FIELD

The disclosure relates generally to fan and turbine Blade Tip Clearance (BTC) sensors in gas turbine engines.

BACKGROUND

Gas turbine engine efficiency is directly related to the level of control of the gap between a blade tip and a corresponding outer air seal. In various embodiments, a capacitance-based BTC probe (cap probe) may be placed proximate the outer air seal to monitor this gap. Traditional cap probes and cap probe installations tend to alter engine structures comprising the outer air seal, tending thereby to alter the air seal and tending to reduce engine efficiency.

SUMMARY

In various embodiments the present disclosure provides a low profile triaxial BTC probe, comprising a first cavity within the first body, and a neck extending radially from the first body, an outer hat insulator disposed within the first cavity, an inner housing, disposed within the first cavity, having a second body and a second cavity within the second body, an inner hat insulator disposed within the second cavity, a sensor element disposed within the second cavity, an inner cap insulator disposed within the second cavity, an inner cap over the inner cap insulator, an outer cap insulator disposed within the first cavity, a cap over the outer cap insulator, and a hard lead comprising a hard shield, a driven guard, and a lead wire.

In various embodiments, the housing further comprises a first top surface, a first bottom surface, a first floor, and a first bore, wherein the first cavity extends from the first top surface of the housing to the first floor, wherein the first bore extends from the first floor through the bottom surface of the housing, wherein the first cavity comprises a first diameter and the first bore comprises a second diameter wherein the second diameter is less than the first diameter. In various embodiments, the outer hat insulator further comprises a first flange, a cylindrical extrusion, and a second bore comprising a third diameter wherein the third diameter is less than the second diameter, wherein the first flange is in contact with the first floor and wherein the cylindrical extrusion is disposed within the first bore. In various embodiments, the inner housing further comprises a second top surface, a second cylindrical extrusion, a second floor, and a third bore, wherein the second cylindrical extrusion extends beneath the second body of the inner housing and is disposed within the second bore, wherein the second cavity extends from the second top surface of the inner housing to the second floor, wherein the third bore extends from the second floor through the second cylindrical extrusion, wherein the second body of the inner housing is in contact with the first flange of the outer hat insulator. In various embodiments, the inner hat insulator comprises a second flange, a third cylindrical extrusion, and a fourth bore through the second flange and the third cylindrical extrusion, wherein the third cylindrical extrusion is disposed within the third bore and the second flange is in contact with the second floor, wherein the sensor element comprises a cylinder and a third flange extending circumferentially about the cylinder, wherein the cylinder is disposed within the fourth bore, wherein the third flange is in contact with the second flange. In various embodiments, the inner housing further comprises an internal neck extending from the second body of the inner housing, wherein the internal neck is disposed within the neck, wherein the hard shield is coupled to and in electronic communication with the neck, wherein the driven guard is coupled to and in electronic communication with the internal neck. In various embodiments, the inner cap insulator contacts the third flange, wherein the inner cap contacts the inner cap insulator, wherein in response to a first force applied to the inner cap, the inner cap is disposed relatively below the second top surface. In various embodiments, the inner cap is welded to the inner housing by a plurality of welds within a plurality of castellations at the second top surface of the inner housing, wherein the plurality of welds are below a surface line defined by a third top surface of the inner cap. In various embodiments, a first internal compressive force is locked within the inner housing in response to the welding the inner cap to the inner housing. In various embodiments, the outer cap insulator contacts the second top surface of the inner housing and defines a gap between the third top surface of the inner cap and the outer cap insulator. In various embodiments, the cap contacts the outer cap insulator and a second force is applied to the cap, wherein the cap is welded to the first body of the housing in response to the second force. In various embodiments, a second internal compressive force is locked within the housing is in response to welding the cap to the first body.

In various embodiments, the present disclosure provides a gas turbine engine comprising fan section having a fan case, a compressor section having a compressor case, a turbine section having a turbine case, and a low profile triaxial blade tip clearance (BTC) probe, comprising a housing having a first body, a first cavity within the first body, and a neck extending radially from the first body, an outer hat insulator disposed within the first cavity, an inner housing, disposed within the first cavity, having a second body and a second cavity within the second body, an inner hat insulator disposed within the second cavity, a sensor element disposed within the second cavity, an inner cap insulator disposed within the second cavity, an inner cap over the inner cap insulator, an outer cap insulator disposed within the first cavity, a cap over the outer cap insulator, and a hard lead comprising a hard shield, a driven guard, and a lead wire.

In various embodiments, the inner cap is welded to the inner housing, in response to a first force applied to the inner cap, by a plurality of welds within a plurality of castellations at a first top surface of the inner housing, wherein the plurality of welds are below a surface line defined by a second top surface of the inner cap. In various embodiments, a first internal compressive force is locked within the inner housing in response to the welding the inner cap to the inner housing. In various embodiments, the outer cap insulator contacts the first top surface of the inner housing and defines a gap between the second top surface of the inner cap and the outer cap insulator. In various embodiments, the cap contacts the outer cap insulator and a second force is applied to the cap, wherein the cap is welded to the first body of the housing in response to the second force. In various embodiments, a second internal compressive force is locked within the housing is in response to welding the cap to the first body. In various embodiments, the housing comprises a portion of at least one of the turbine case or the compressor case.

In various embodiments, the present disclosure provides a method of manufacturing a low profile triaxial BTC probe, the method comprising forming a housing having a first cavity, and a neck and forming an inner housing having a second cavity and an internal neck, inserting an outer hat insulator into the first cavity, the inner housing into the first cavity, and an inner hat insulator into the second cavity, aligning the neck and the internal neck, inserting a hard lead comprising a hard shield, a driven guard, and a lead wire into the neck, inserting the driven guard and the lead wire into the internal neck, coupling the hard lead to the neck about the hard shield, and coupling the driven guard to the internal neck about the driven guard, bending the lead wire toward a sidewall of the second cavity, inserting an inner hat insulator into the second cavity, and inserting a sensor element into the second cavity, coupling the lead wire to the sensor element, aligning an inner cap insulator and an inner cap and inserting the inner cap insulator and the inner cap into the second cavity, coupling the inner cap to the inner housing while a first compressive force is applied to the inner cap, inserting an outer cap insulator into the first cavity, and coupling a cap to the housing while a second compressive force is applied to the cap.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5A illustrates a cross section of a low profile triaxial BTC probe, in accordance with various embodiments;

FIG. 6A illustrates a cross section of a housing of a low profile triaxial BTC probe, in accordance with various embodiments;

FIG. 6B illustrates a perspective view of a housing of a low profile triaxial BTC probe, in accordance with various embodiments;

FIG. 7A illustrates a cross section of a housing of a low profile triaxial BTC probe, in accordance with various embodiments;

FIG. 7B illustrates a perspective view of a housing of a low profile triaxial BTC probe, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
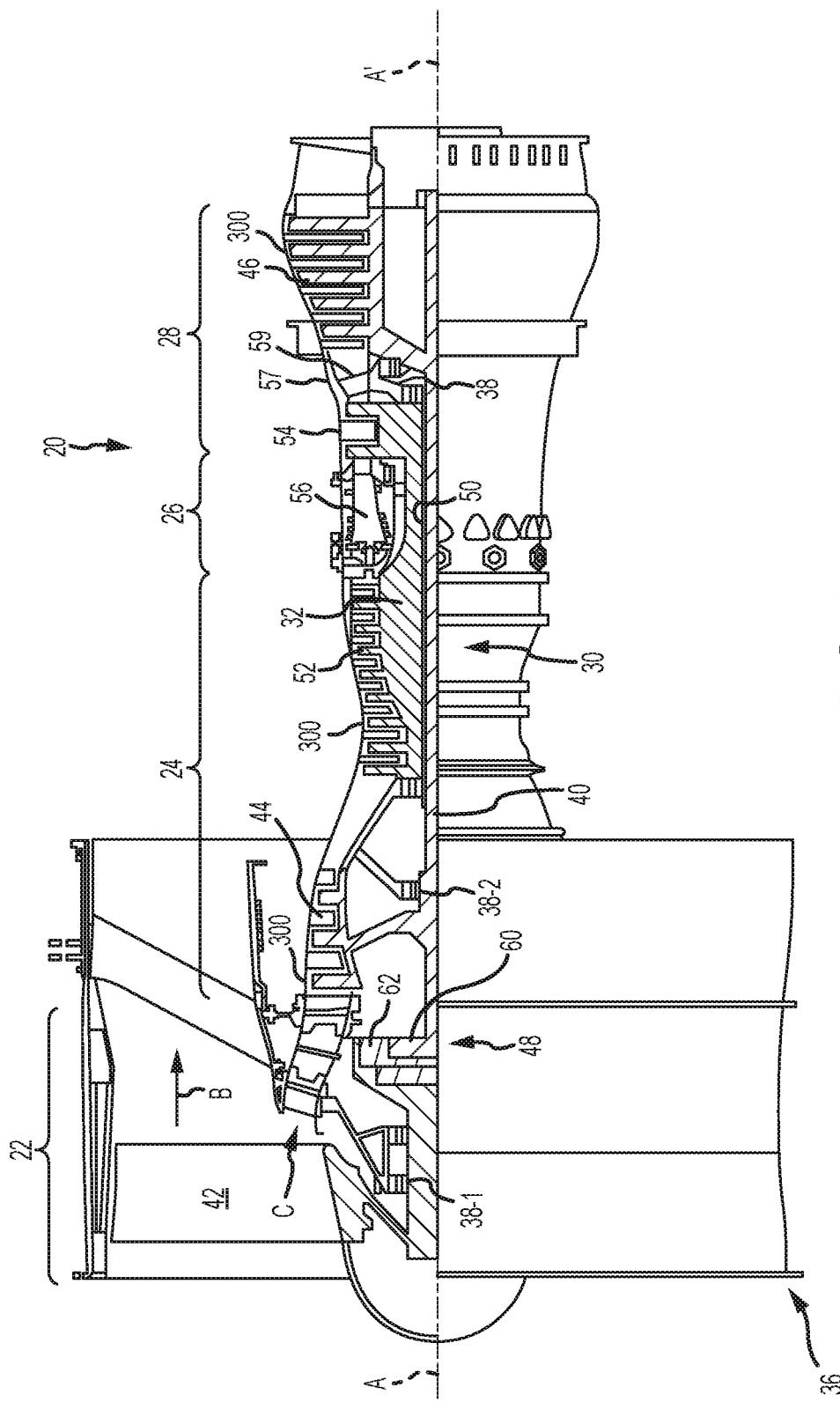
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46.

Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter). In various embodiments, one or more low profile triaxial BTC probes 300 (FIG. 3 described below) may be located radially outward of a compressor blade of compressor section 24, a turbine blade of turbine section 28 and may be embedded, respectively, in a compressor case or a turbine case, or as may be located radially outward of a fan blade as described below with reference to FIG. 2.

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
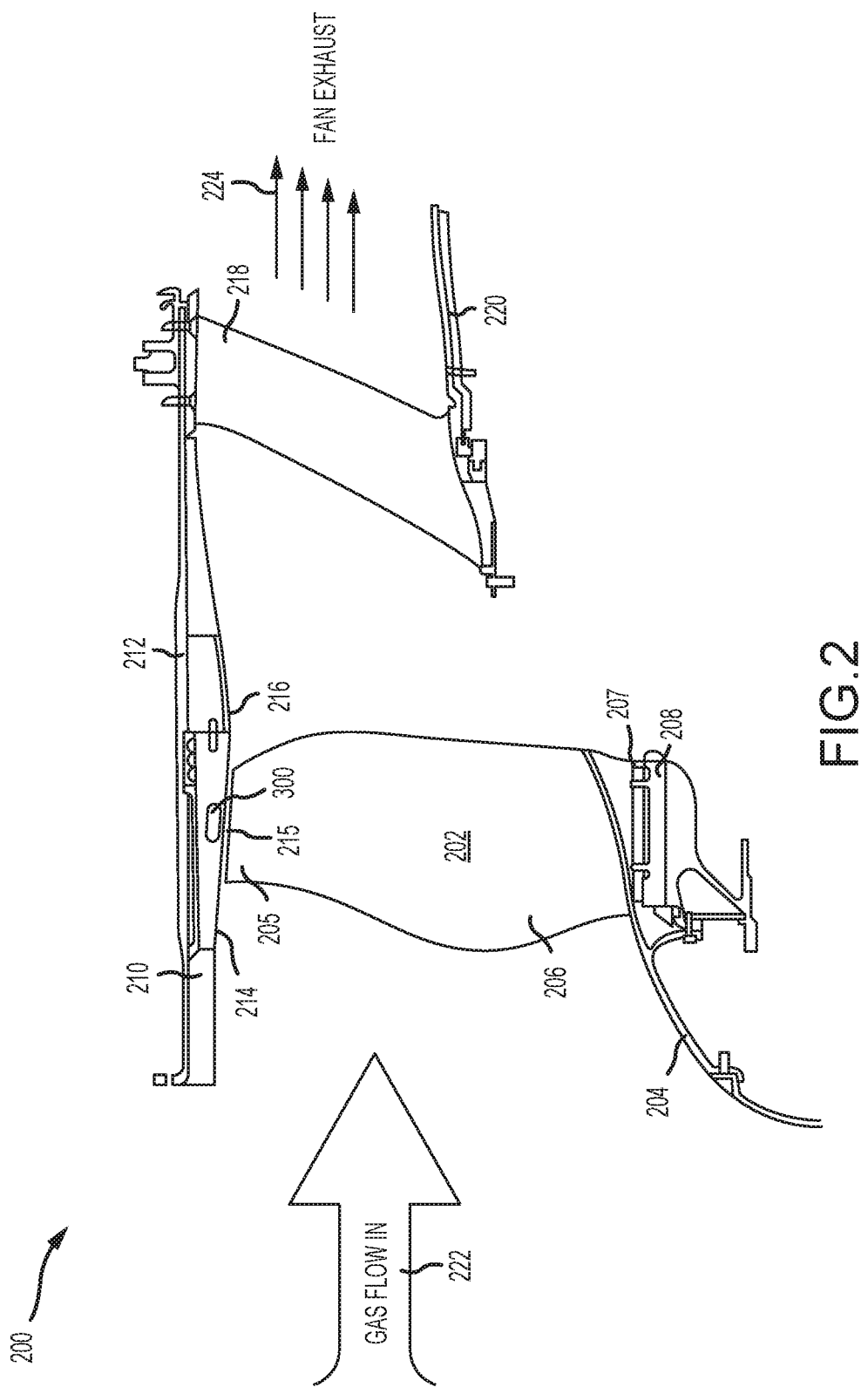
FIG. 2 illustrates a fan section having a low profile triaxial BTC probe, in accordance with various embodiments.

According to various embodiments and with reference to FIGS. 1 and 2, a fan section 200 having a low profile triaxial BTC probe 300, is provided. Fan 202 comprises blade 206 coupled at blade root 207 to a fan disk 208 and compressor inlet cone 204. Fan 202 may be coupled to a shaft, such as inner shaft 40, where inner shaft 40 may be in mechanical communication with geared architecture 48, or may be in mechanical communication with the low spool shaft directly. Tip 205 of blade 206 lies proximate rub strip 214 which forms a part of the inner aerodynamic surface 216 of fan case 210. A low profile triaxial BTC probe 300 lies radially outward of blade 206 and proximate tip 205 between inner aerodynamic surface 216 and outer casing 212 of fan case 210. In various embodiments, low profile triaxial BTC probe 300 comprises a portion of rub strip 214 and may be co-molded in part with rub strip 214 or may be embedded within rub strip 214. Fan case 210 may be coupled at an aft end to pylon 218 which may be coupled to compressor casing 220. As fan 202 rotates about the shaft it tends to draw in gas 222, such as, for example air, at the fore end of fan case 210. Rotating fan 202 tends to accelerate gas 222 along inner aerodynamic surface 216 toward pylon 218 passing between inner aerodynamic surface 216 and compressor casing 220 as fan exhaust 224.

In various embodiments, portion of gas 222 may escape fan 202 by passing over tip 205 through a gap 215 between tip 205 and inner aerodynamic surface 216 tending to decrease efficiency. In various embodiments, the width of gap 215 between tip 205 and inner aerodynamic surface 216 may vary with respect to a position along the chord line of blade 206. The low profile triaxial BTC probe 300 may be located axially (relative to the axis of rotation of fan 202, with momentary reference to A-A' in FIG. 1) within a bounded portion of rub strip 214 bounded at the forward end by a leading edge of blade 206 and at the aft end by a trailing edge of blade 206. In various embodiments, a plurality of a low profile triaxial BTC probes may be located axially within the bounded portion of rub strip 214 along the chord of blade 206. In various embodiments, a plurality of a low profile triaxial BTC probes may be located circumferentially around fan section 200 within the bounded portion of rub strip 214.

Figure 3:
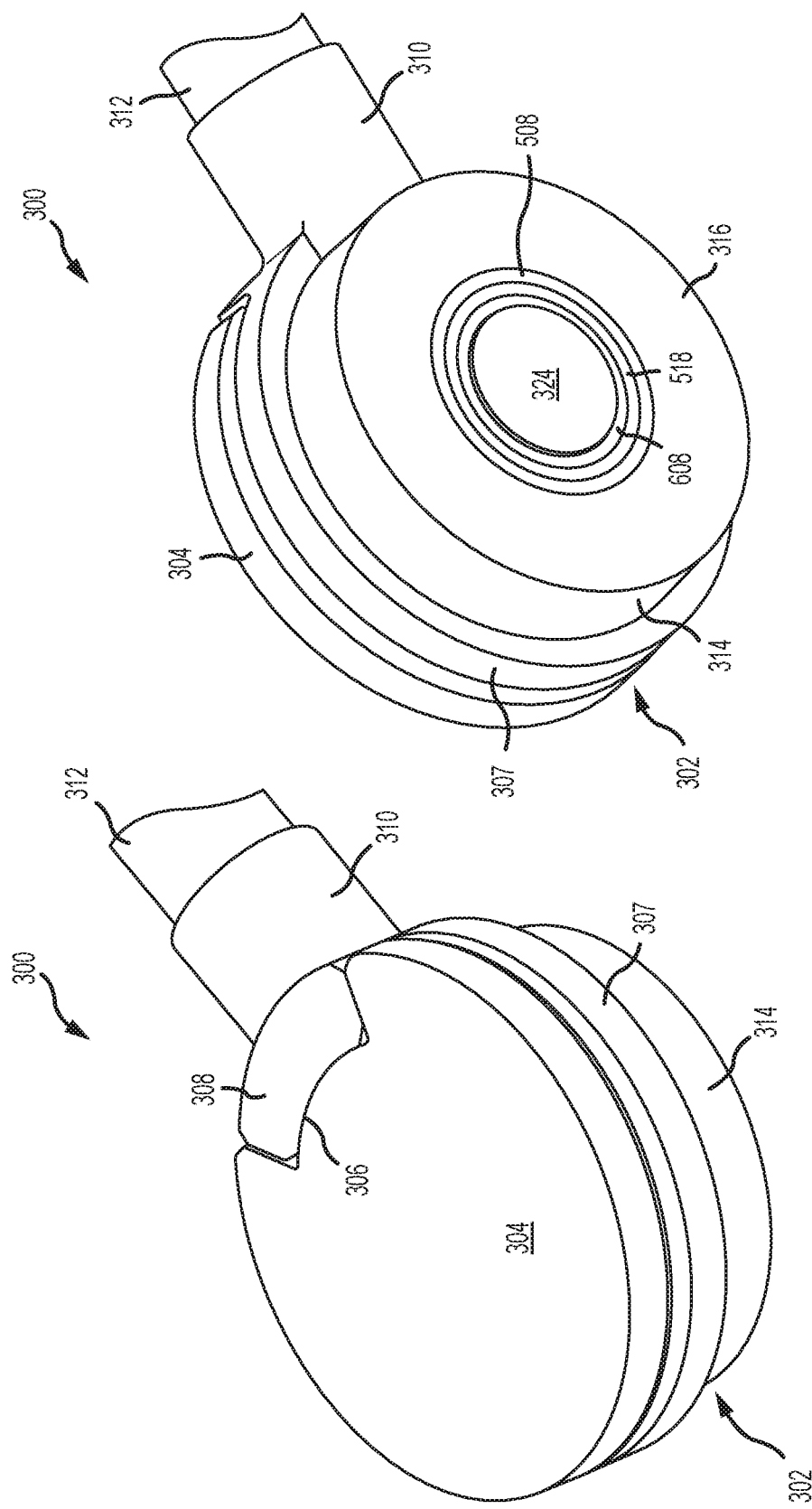
FIG. 3 illustrates a low profile triaxial BTC probe, in accordance with various embodiments.

With additional reference to FIGS. 3 and 5A, a low profile triaxial BTC probe 300 comprises a housing 302 and a cap 304. In various embodiments, housing 302 may comprise a portion of rub strip 214, or may comprise a portion of a turbine case, or a compressor case. In various embodiments, cap 304 may comprise an alignment feature 306 configured to align with an alignment block 308 of housing 302. In various embodiments, housing 302 may further comprise a body 307 (i.e. a first body) having a top surface 318 and a cylindrical portion 314 extending toward a bottom surface 316. A neck 310 may extend radially from body 307 and alignment block 308 may comprise a portion of neck 310. In various embodiments, a hard lead 312 may be inserted through housing 302 via neck 310.

Figure 4:
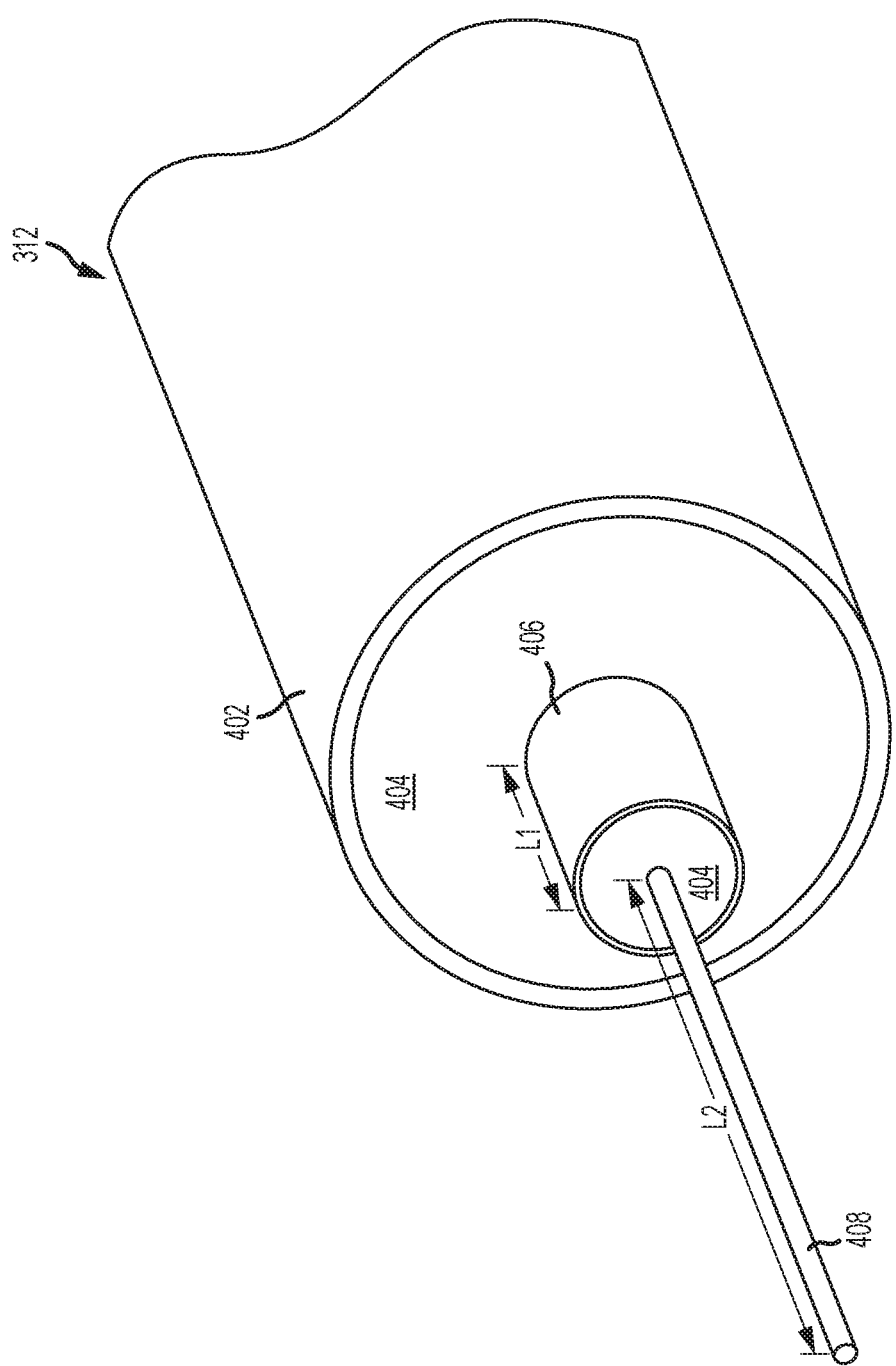
FIG. 4 illustrates a low a hard lead comprising a driven guard, in accordance with various embodiments.

In various embodiments, and with brief reference to FIG. 4, a hard lead such as hard lead 312 may be a driven guard hard lead and comprise a lead wire 408 surrounded by a driven guard 406 containing a first layer of insulating material 404 therein. Driven guard 406 is surrounded by a second layer of insulating material 404 contained within a hard shield 402 such as, for example, a metallic tube such as one of a steel, a stainless steel, an alloy, and/or an aluminum. In various embodiments, a length L1 of driven guard 406 and a length L2 of lead wire 408 are exposed for assembly. Lead wire 408 is coupled to and is in electronic communication with sensor element 324. In various embodiments, hard shield 402 is coupled to and in electronic communication with housing 302. In various embodiments, driven guard 406 may be coupled to and in electronic communication with an interior structure of housing 302 such as, for example, an inner housing 510 as described below (ref. FIGS. 5A and 5B). In various embodiments, a hard lead such as hard lead 312 may have a diameter about 0.125 in. (3.175 mm) where about in this context means +/−0.015 in. (0.381 mm).

In various embodiments, sensor element 324 is energized by lead wire 408 and an electric field flows between sensor element 324 and housing 302. As a blade tip, such as tip 205 of blade 206, passes proximate to sensor element 324, an electric field tends to flow across gap 215 into the blade tip inducing a capacitance between the blade tip and the sensor element 324 which tends to vary with respect to the width of gap 215. In this regard, the gap between a blade tip and an outer aerodynamic surface may be determined as a function of the change in capacitance occurring at a frequency which is a function of the time the blade tip dwells within the electric field.

Figure 5C:
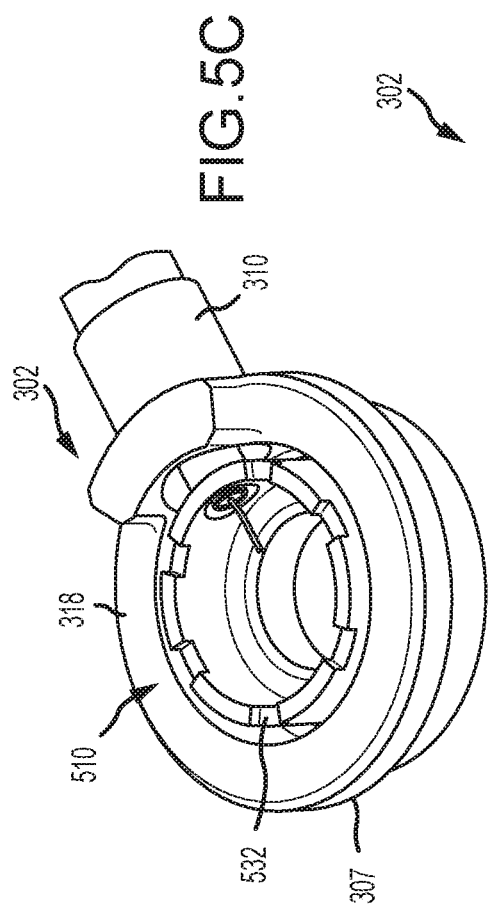
FIG. 5C illustrates a perspective view of a housing of a low profile triaxial BTC probe, in accordance with various embodiments.
Figure 5B:
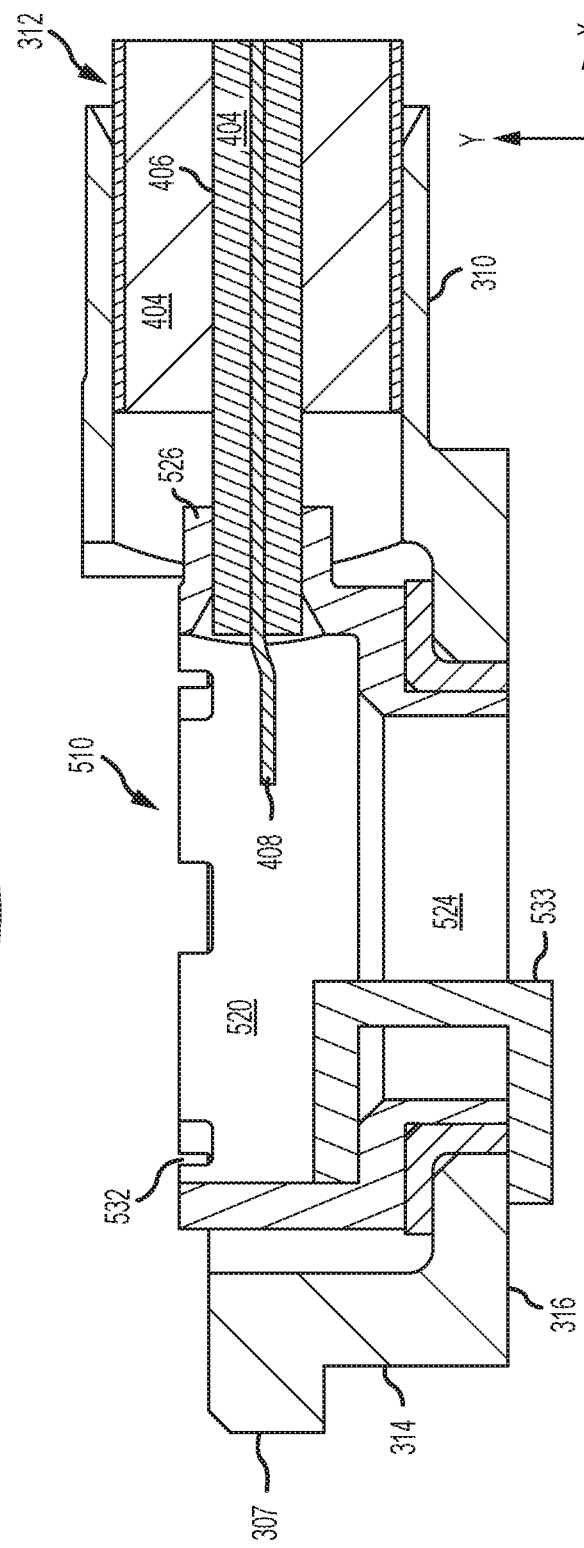
FIG. 5B illustrates a cross section of a housing of a low profile triaxial BTC probe, in accordance with various embodiments.

In various embodiments and with additional reference to FIGS. 5A through 5C, housing 302 of low profile triaxial BTC probe 300 is shown in cross-section and in perspective with cap 304 removed. In various embodiments, neck 310 comprises a chamfered mouth 320 leading into a passage 322 extending through the neck into a first cavity 326 within body 307 which is open at top surface 318 and extends from top surface 318 downward through body 307 terminating at floor 328. Body 307 further comprises a first bore 330 which extends from first cavity 326 beneath floor 328 and through bottom surface 316 of body 307. In various embodiments, first cavity 326 may comprise a first diameter D1 and first bore 330 may comprise a second diameter D2 wherein D2 is less than D1.

An outer hat insulator 500 is shown inserted into first cavity 326 and first bore 330 and comprises a flange 502 having a thickness T1 (along the y-axis) between a top surface and a bottom surface and a cylindrical extrusion 504 (i.e., a first cylindrical extrusion) extending beneath (along the y-axis) flange 502 toward a bottom surface 508 of the cylindrical extrusion 504. Flange 502 rests in contact with floor 328 and cylindrical extrusion 504 is disposed within first bore 330. In various embodiments, outer hat insulator 500 comprises a second bore 506 through the thickness T1 of flange 502 and cylindrical extrusion 504 to bottom surface 508 where second bore 506 has a third diameter D3 where D3 is less than D2. In various embodiments, a hat insulator such as outer hat insulator 500 may comprise one or more a dielectric ceramics, such as, for example aluminum oxide such as a 99.5% by weight pure aluminum oxide, meaning that 99.5% by weight is free from impurities and/or other constituents .[others?]

An inner housing 510 is shown inserted into first cavity 326 and into second bore 506 of outer hat insulator 500. Inner housing 510 comprises a body 512 having a top surface 514 and a second cylindrical extrusion 516, wherein the second cylindrical extrusion is sized to fit within second bore 506, extending relatively beneath (along the y-axis) body 512 toward a bottom surface 518. Body 512 of inner housing 510 rests in contact with flange 502 of outer hat insulator 500. Internal neck 526 extends radially from body 512 into passage 322 and comprises a passage 528 opening into a second cavity 520 at chamfer 530. Inner housing 510 comprises the second cavity 520 extending from top surface 514 to second floor 522 and a third bore 524 extending through second cylindrical extrusion 516 from second cavity 520 through bottom surface 518. Third bore 524 comprises a fourth diameter D4 wherein D4 is less than D3. In various embodiments, second floor 522 may comprise a chamfer 523 leading into third bore 524. In various embodiments, top surface 514 may further comprise a plurality of castellations 532.

In various embodiments and as shown in FIG. 5B neck 310 and internal neck 526 may be aligned and held in alignment by a fixture 533 while hard lead 312 is inserted into housing 302 via neck 310 and driven guard is inserted into inner housing 510 via internal neck 526. Passage 322 is sized to provide ingress for hard lead 312 which may be coupled to passage 322 at hard shield 402 at chamfered mouth 320 and passage 528 is sized to provide ingress for driven guard 406 which may be coupled to passage 528 at chamfer 530. In various embodiments, hard shield 402 may be coupled to passage 322 and driven guard 406 may be coupled to passage 528 by one of brazing or welding and lead wire 408 may, prior to being coupled to sensor element 324, be bent toward a sidewall of second cavity 520 tending thereby to provide clearance for insertion of an inner hat insulator and sensor element 324 during buildup. In various embodiments, brazing of driven guard 406 and hard shield 402 may comprise a gold-nickel braze slurry applied at chamfered mouth 320 and chamfer 530 and may comprise brazing in a brazing furnace under vacuum. In various embodiments, a housing such as housing 302 or inner housing 510 may comprise at least one of metal, a steel, a stainless steel, an alloy, or a nickel alloy and may have a first Coefficient of Thermal Expansion (CTE).

In various embodiments and with additional reference to FIGS. 6A and 6B, housing 302 is shown in cross section having an inner hat insulator 600 inserted downward (along the y-axis) past lead wire 408 into second cavity 520 and third bore 524. Inner hat insulator 600 and comprises a flange 602 (i.e., a second flange) having a thickness T2 (along the y-axis) between a top surface and a bottom surface and a cylindrical extrusion 604 (i.e. a third cylindrical extrusion) extending beneath (along the y-axis) flange 602 toward a bottom surface 608 of the cylindrical extrusion 604. Flange 602 rests in contact with second floor 522 and cylindrical extrusion 604 is disposed within third bore 524. In various embodiments, inner hat insulator 600 comprises a fourth bore 606 through the thickness T2 of flange 602 and cylindrical extrusion 604 to bottom surface 608 where fourth bore 606 has a fifth diameter D5 where D5 is less than D4. Sensor element 324 is shown inserted downward past lead wire 408 into fourth bore 606 and comprises a cylinder 610 having the diameter D5 or less at base 612 and a flange 614 extending circumferentially about cylinder 610 and perpendicular to the axis of cylinder 610 at a top surface 618 opposite base 612. In various embodiments, flange 614 (i.e., a third flange) comprises a thickness T3 along the y-axis and rests in contact with flange 602. In various embodiments, lead wire 408 is coupled at top surface 618 of sensor element 324 and may be welded to sensor element 324 and staked or potted such as, for example, by one of an epoxy, glue, or enamel.

In various embodiments and with additional reference to FIGS. 7A and 7B, inner cap insulator 700 having a thickness T4 and a diameter defined by flange 614 is shown inserted into second cavity 520 with clearance cutout 702 aligned with lead wire 408. Clearance cutout 702 is cut fully through the thickness T4. Inner cap 704 has thickness T5 and a clearance cutout 706 cut into bottom surface 712 partially through thickness T4 toward top surface 710 and is shown inserted over (above, relative to the y-axis) the inner cap insulator 700. Inner cap 704 has an alignment slot 708 cut across its diameter and is aligned in response to disposing alignment slot 708 proximate internal neck 526 tending thereby to dispose clearance cutout 706 above (relative to the y-axis) clearance cutout 702. In various embodiments, a force F1 is applied to the top surface 710 of inner cap 704 tending thereby to compress inner cap 704, inner cap insulator 700, sensor element 324, and inner hat insulator 600 within inner housing 510. In response to force F1, top surface 710 of inner cap 704 is disposed relatively below (along the y-axis) top surface 514 of inner housing 510. In various embodiments, top surface 710 may be disposed about 0.002 in. (0.0508 mm) below top surface 514 where about in this context means ±0.001 in. (0.0254 mm) in response to force F1. In various embodiments, inner cap 704 may be welded to inner housing 510 while force F1 is applied to inner cap 704 tending thereby to compress inner cap insulator 700, sensor element 324, and inner hat insulator 600 and, in response to the welding, F1 may be locked within inner housing 510 as a first internal compressive force tending to hold the inner cap insulator 700, sensor element 324, and inner hat insulator 600 in compression. In various embodiments force F1 may be between 20 lbf (89 N) and 60 lbf (267 N), or may be between 25 lbf (111 N) and 50 lbf (222 N), or may be between 30 lbf (133 N) and 40 lbf (178 N). In various embodiments, the first internal compressive force may decrease in response to an increase in temperature of low profile triaxial BTC probe 300. In various embodiments, a cap insulator such as inner cap insulator 700 may comprise one of a dielectric ceramic, such as, for example a 99.5% pure aluminum oxide.

Figure 8A:
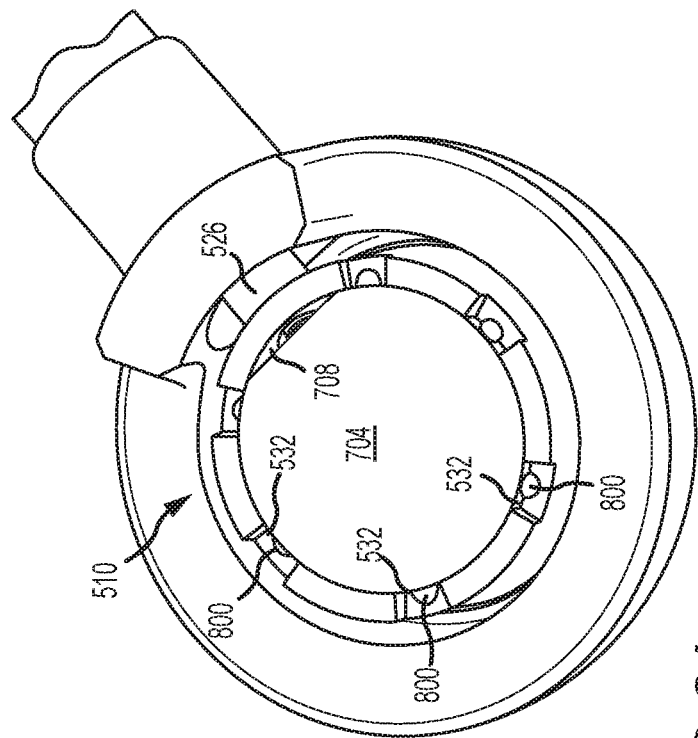
FIG. 8A illustrates welds within a housing of a low profile triaxial BTC probe, in accordance with various embodiments.
Figure 8B:
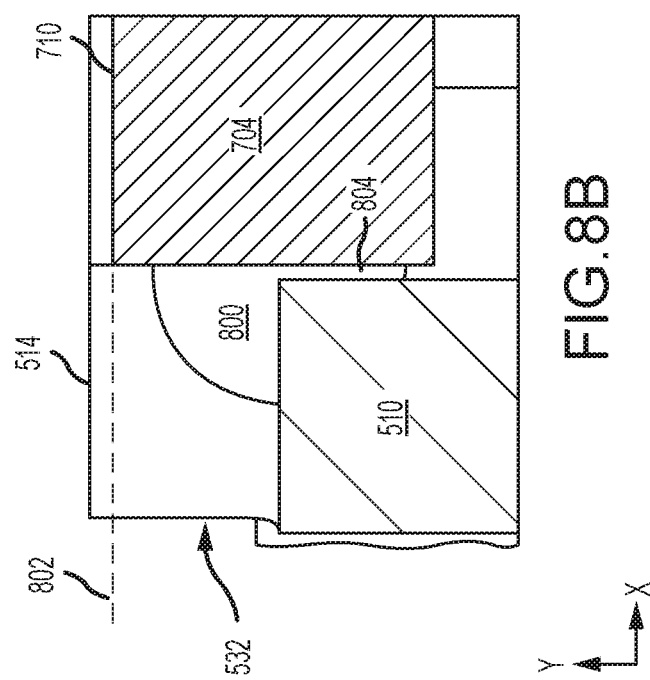
FIG. 8B illustrates a cross section of welds within a housing of a low profile triaxial BTC probe, in accordance with various embodiments.

In various embodiments and with additional reference to FIGS. 8A and 8B, inner housing 510 is shown with inner cap 704 welded in position by a plurality of welds 800 placed at castellations 532 with alignment slot 708 proximate internal neck 526. Welds 800 are within castellations 532 and below surface line 802 defined by top surface 710 of inner cap 704. In various embodiments, welds 800 may be evenly spaced about the circumference of inner cap 704 and may define a circumferential gap 804 between the welds 800, the inner cap 704 and the inner housing 510 of which may run about 0.075 in. (1.905 mm) around the circumference of inner cap 704 where about in this context means +0.150 in. (3.81 mm) or −0.020 in. (0.508 mm).

Figure 9:
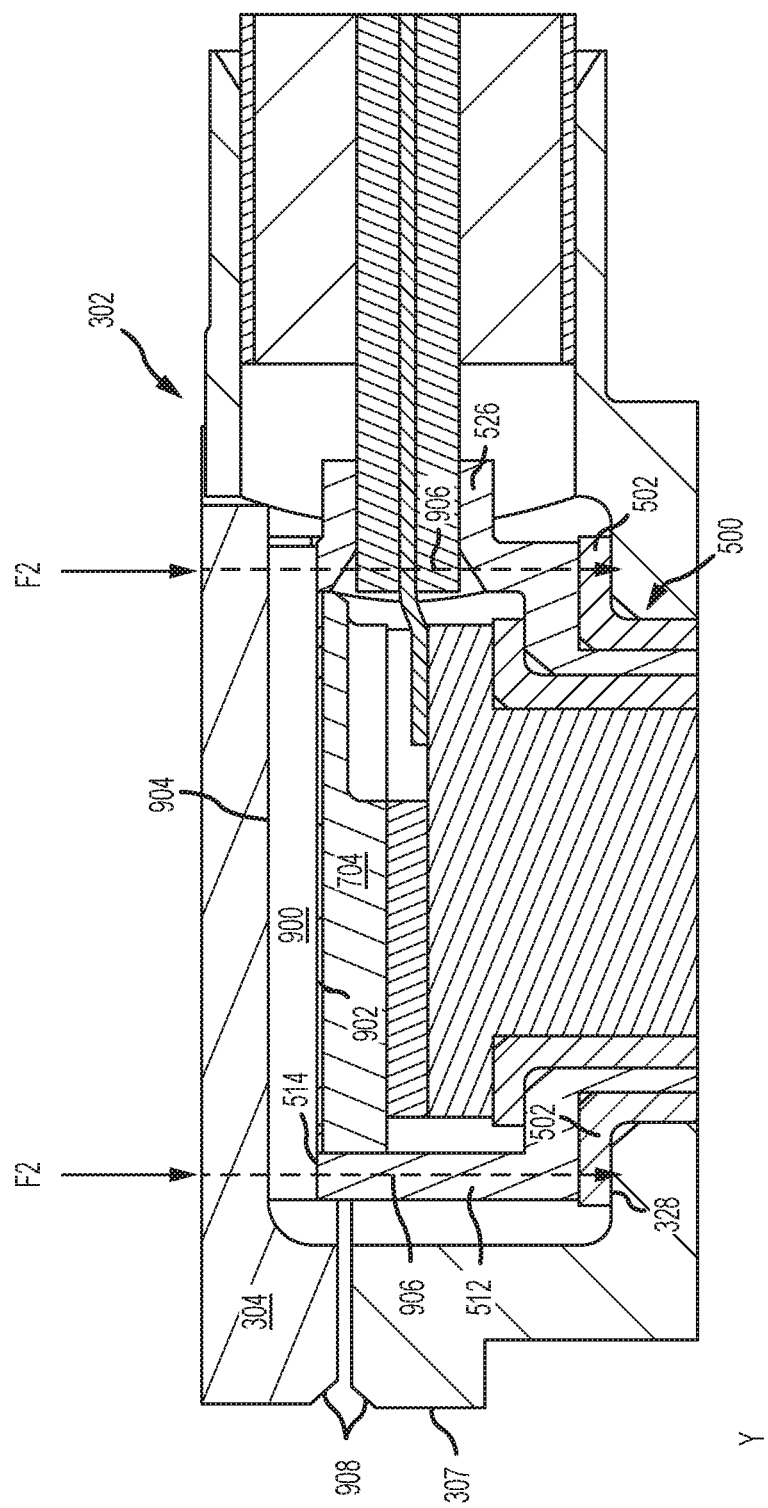
FIG. 9 illustrates a cross section of a housing of a low profile triaxial BTC probe, in accordance with various embodiments.

In various embodiments and with additional reference to FIG. 9, an outer cap insulator 900 is disposed over (relative to the y-axis) inner cap 704 and contacted with top surface 514 of inner housing 510 defining gap 902 between inner cap 704 and outer cap insulator 900. Cap 304 is placed over (above, relative to the y-axis) outer cap insulator 900 and contacted along top surface 904 of outer cap insulator 900. In various embodiments, outer cap insulator may comprise a disk having an annulus defined by the diameter the inner cap 704. In various embodiments, a force F2 is applied to cap 304 while cap 304 is welded to body 307 of housing 302 at opposed chamfers 908. In various embodiments, F2 is applied such that, in response to the force F2, a load path 906 is formed through cap 304 outer cap insulator 900, through body 512 of inner housing 510, through flange 502 of outer hat insulator 500, and terminating at floor 328 (i.e., a first floor) of body 307. In this regard, force F2 tends to compress outer cap insulator 900, inner housing 510, and outer hat insulator 500 within housing 302 and, in response to welding cap 304 to body 307, F2 may be locked within housing 302 as a second internal compressive force tending to hold the outer cap insulator 900, inner housing 510, and outer hat insulator 500 in compression. In various embodiments force F2 may be between 20 lbf (89 N) and 100 lbf (445 N), or may be between 40 lbf (178 N) and 80 lbf (356 N), or may be between 50 lbf (222 N) and 60 lbf (267 N). In various embodiments, the second internal compressive force may decrease in response to an increase in temperature of low profile triaxial BTC probe 300.

Figure 10:
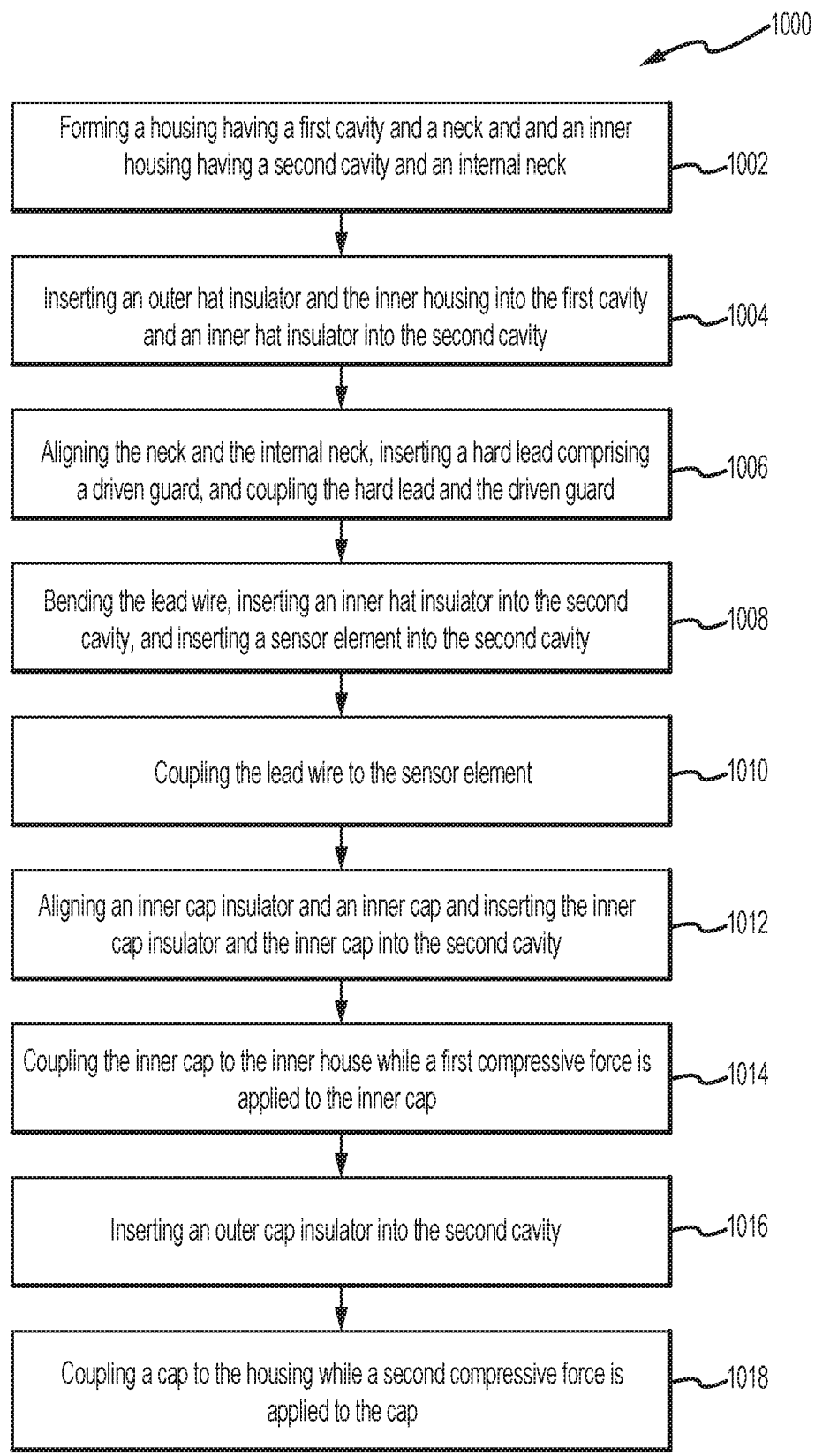
FIG. 10 illustrates a method of manufacturing a low profile triaxial BTC probe, in accordance with various embodiments.

In various embodiments and with reference now to FIG. 10, a method 1000 of fabricating a low profile triaxial BTC probe may comprise forming a housing having a first cavity, and a neck and forming an inner housing (step 1002) having a second cavity and an internal neck; and inserting an outer hat insulator into the first cavity, the inner housing into the first cavity, and an inner hat insulator into the second cavity (step 1004). The method may further comprise aligning the neck and the internal neck, inserting a hard lead comprising a hard shield, a driven guard, and a lead wire into the neck, inserting the driven guard and the lead wire into the internal neck, coupling the hard lead to the neck about the hard shield, and coupling the driven guard to the internal neck about the driven guard (step 1006). In various embodiments, the method may further comprise bending the lead wire toward a sidewall of the second cavity, inserting an inner hat insulator into the second cavity, and inserting a sensor element into the second cavity (step 1108). The method may further comprise coupling the lead wire to the sensor element (step 1010). The method may further comprise aligning an inner cap insulator and an inner cap and inserting the inner cap insulator and the inner cap into the second cavity (step 1012). The method may further comprise coupling the inner cap to the inner housing while a first compressive force F1 is applied to the inner cap (step 1014). In various embodiments, the method may further comprise inserting an outer cap insulator into the first cavity (step 1016). In various embodiments, the method may further comprise coupling a cap to the housing while a second compressive force F2 is applied to the cap (step 1018).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A low profile triaxial blade tip clearance (BTC) probe, comprising:
    a housing having a first body, a first cavity within the first body, and a neck extending radially from the first body;
    an outer hat insulator disposed within the first cavity;
    an inner housing, disposed within the first cavity, having a second body and a second cavity within the second body;
    an inner hat insulator disposed within the second cavity;
    a sensor element disposed within the second cavity;
    an inner cap insulator disposed within the second cavity;
    an inner cap over the inner cap insulator;
    an outer cap insulator disposed within the first cavity;
    a cap over the outer cap insulator; and
    a hard lead comprising a hard shield, a driven guard, and a lead wire.

2. The low profile triaxial BTC probe of claim 1, wherein the housing further comprises a first top surface, a first bottom surface, a first floor, and a first bore, wherein the first cavity extends from the first top surface of the housing to the first floor, wherein the first bore extends from the first floor through the first bottom surface of the housing, wherein the first cavity comprises a first diameter and the first bore comprises a second diameter wherein the second diameter is less than the first diameter.

3. The low profile triaxial BTC probe of claim 2, wherein the outer hat insulator further comprises a first flange, a cylindrical extrusion, and a second bore comprising a third diameter wherein the third diameter is less than the second diameter, wherein the first flange is in contact with the first floor and wherein the cylindrical extrusion is disposed within the first bore.

4. The low profile triaxial BTC probe of claim 3, wherein the inner housing further comprises a second top surface, a second cylindrical extrusion, a second floor, and a third bore, wherein the second cylindrical extrusion extends beneath the second body of the inner housing and is disposed within the second bore, wherein the second cavity extends from the second top surface of the inner housing to the second floor, wherein the third bore extends from the second floor through the second cylindrical extrusion, wherein the second body of the inner housing is in contact with the first flange of the outer hat insulator.

5. The low profile triaxial BTC probe of claim 4, wherein the inner hat insulator comprises a second flange, a third cylindrical extrusion, and a fourth bore through the second flange and the third cylindrical extrusion, wherein the third cylindrical extrusion is disposed within the third bore and the second flange is in contact with the second floor, wherein the sensor element comprises a cylinder and a third flange extending circumferentially about the cylinder, wherein the cylinder is disposed within the fourth bore, wherein the third flange is in contact with the second flange.

6. The low profile triaxial BTC probe of claim 5, wherein the inner housing further comprises an internal neck extending from the second body of the inner housing, wherein the internal neck is disposed within the neck, wherein the hard shield is coupled to and in electronic communication with the neck, wherein the driven guard is coupled to and in electronic communication with the internal neck.

7. The low profile triaxial BTC probe of claim 6, wherein the inner cap insulator contacts the third flange, wherein the inner cap contacts the inner cap insulator, wherein in response to a first force applied to the inner cap, the inner cap is disposed relatively below the second top surface.

8. The low profile triaxial BTC probe of claim 7, wherein the inner cap is welded to the inner housing by a plurality of welds within a plurality of castellations at the second top surface of the inner housing, wherein the plurality of welds are below a surface line defined by a third top surface of the inner cap.

9. The low profile triaxial BTC probe of claim 8, wherein a first internal compressive force is locked within the inner housing in response to the welding the inner cap to the inner housing.

10. The low profile triaxial BTC probe of claim 9, wherein the outer cap insulator contacts the second top surface of the inner housing and defines a gap between the third top surface of the inner cap and the outer cap insulator.

11. The low profile triaxial BTC probe of claim 10, wherein the cap contacts the outer cap insulator and a second force is applied to the cap, wherein the cap is welded to the first body of the housing in response to the second force.

12. The low profile triaxial BTC probe of claim 11, wherein a second internal compressive force is locked within the housing is in response to welding the cap to the first body.

13. A gas turbine engine comprising:
    a fan section having a fan case;
    a compressor section having a compressor case;
    a turbine section having a turbine case; and
    a low profile triaxial blade tip clearance (BTC) probe, comprising:
        a housing having a first body, a first cavity within the first body, and a neck extending radially from the first body;
        an outer hat insulator disposed within the first cavity;
        an inner housing, disposed within the first cavity, having a second body and a second cavity within the second body;
        an inner hat insulator disposed within the second cavity;
        a sensor element disposed within the second cavity;
        an inner cap insulator disposed within the second cavity;
        an inner cap over the inner cap insulator;
        an outer cap insulator disposed within the first cavity;
        a cap over the outer cap insulator; and
    a hard lead comprising a hard shield, a driven guard, and a lead wire.

14. The gas turbine engine of claim 13, wherein the inner cap is welded to the inner housing, in response to a first force applied to the inner cap, by a plurality of welds within a plurality of castellations at a first top surface of the inner housing, wherein the plurality of welds are below a surface line defined by a second top surface of the inner cap.

15. The gas turbine engine of claim 14, wherein a first internal compressive force is locked within the inner housing in response to the welding the inner cap to the inner housing.

16. The gas turbine engine of claim 15, wherein the outer cap insulator contacts the first top surface of the inner housing and defines a gap between the second top surface of the inner cap and the outer cap insulator.

17. The gas turbine engine of claim 16, wherein the cap contacts the outer cap insulator and a second force is applied to the cap, wherein the cap is welded to the first body of the housing in response to the second force.

18. The gas turbine engine of claim 17, wherein a second internal compressive force is locked within the housing is in response to welding the cap to the first body.

19. The gas turbine engine of claim 18, wherein the housing comprises a portion of at least one of the turbine case or the compressor case.

20. A method of manufacturing a low profile triaxial blade tip clearance (BTC) probe, the method comprising:
- forming a housing having a first cavity, and a neck and forming an inner housing having a second cavity and an internal neck;
- inserting an outer hat insulator into the first cavity, the inner housing into the first cavity, and an inner hat insulator into the second cavity;
- aligning the neck and the internal neck;
- inserting a hard lead comprising a hard shield, a driven guard, and a lead wire into the neck, inserting the driven guard and the lead wire into the internal neck, coupling the hard lead to the neck about the hard shield, and coupling the driven guard to the internal neck about the driven guard;
- bending the lead wire toward a sidewall of the second cavity, inserting an inner hat insulator into the second cavity, and inserting a sensor element into the second cavity;
- coupling the lead wire to the sensor element;
- aligning an inner cap insulator and an inner cap and inserting the inner cap insulator and the inner cap into the second cavity;
- coupling the inner cap to the inner housing while a first compressive force is applied to the inner cap;
- inserting an outer cap insulator into the first cavity; and
- coupling a cap to the housing while a second compressive force is applied to the cap.

* * * * *